Figure 1:
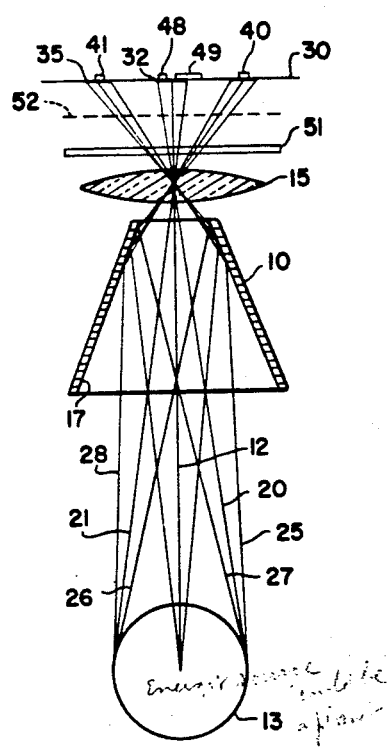

Sept. 26, 1967     T. NORMAN     3,343,445

CONTROL APPARATUS

Filed Sept. 27, 1962         2 Sheets-Sheet 1

INVENTOR.
THOMAS NORMAN
BY Charles J. Ungemach
ATTORNEY

Sept. 26, 1967     T. NORMAN     3,343,445
CONTROL APPARATUS
Filed Sept. 27, 1962     2 Sheets-Sheet 2

INVENTOR.
THOMAS NORMAN
BY Charles J. Ungemach
ATTORNEY

United States Patent Office 3,343,445
Patented Sept. 26, 1967

3,343,445
CONTROL APPARATUS
Thomas Norman, Los Angeles, Calif., assignor to
Honeywell Inc., a corporation of Delaware
Filed Sept. 27, 1962, Ser. No. 226,693
2 Claims. (Cl. 88—1)

This invention relates to control apparatus and more particularly to apparatus for controlling the attitude of an object with respect to a source of energy. The invention finds use in a number of devices such as autocollimators for aligning the body with respect to light or other type radiant energy source and also may find use in apparatus such as horizon sensors and attitude indicating devices for space vehicles. The invention will be described in terms of its use as a horizon sensor and attitude controller on a space vehicle although it is to be understood that the invention is not limited to such a use.

In the past a number of horizon sensors have been employed which normally involved the use of rotating mirrors or other elements normally found undesirable for space use because of the difficulty encountered in bearing lubrication and so horizon sensors with no moving parts have been deemed most desirable. A horizon sensor of this type may be found in the copending application of Joseph E. Killpatrick, Ser. No. 101,238, filed Apr. 6, 1961, assigned to the same assignee as the present invention. The present invention is an improvement over the disclosure in the above referenced Killpatrick application and more specifically is designed to improve the range of useful operativeness and in addition to provide an indication of altitude.

Briefly, the invention comprises the use of a hollow truncated cone or other suitable surface of revolution having an inner surface polished so as to reflect the radiant energy from some energy source such as a planet. A lens is placed proximate to the small or truncated end of the cone and energy from the planet is received on the lens through the cone both directly so as to cause a first or direct image to be formed and also by way of reflection off the inner surface of the cone in such a manner that a second or indirect image is formed which is annular in shape and is normally approximately concentric with the direct image. Suitable sensors are placed near the image plane of the lens to detect the position of the annular image and to provide an output whenever the annular image moves from a position concentric with the direct image. If the cone and lens are mounted on a space vehicle and the axes of the cone and lens are pointed directly at the planet about which attitude orientation is desired any departure of the axes from a line to the center of the planet causes the annular image to move with respect to the direct image and the sensors produce an output. Suitable control apparatus is then actuated to position the space vehicle in such a manner as to restore the axis of the cone and lens to its original desired position. By this means the space vehicle attitude with respect to the planet may be maintained at all times.

The size of the direct image of the planet when the attitude of the space vehicle is correct may then be used to determine the altitude of the vehicle with respect to the planet. Suitable sensors are provided by this invention which measure the size of the direct image to thus provide an output indicative of the angle subtended by the planet from the space vehicle which angle is indicative of the distance between the planet and the space vehicle.

It is therefore an object of the present invention to provide sensing apparatus for use on an object so as to maintain a predetermined attitude of the object with respect to a source of energy and to give an output indicative of the distance between the object and the source of energy.

Figure 2:
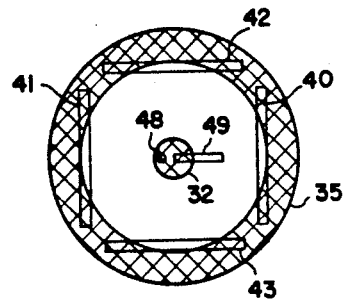
Figure 3:
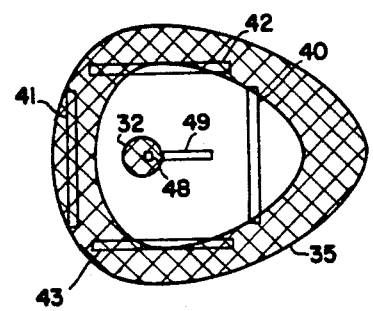
Figure 4:
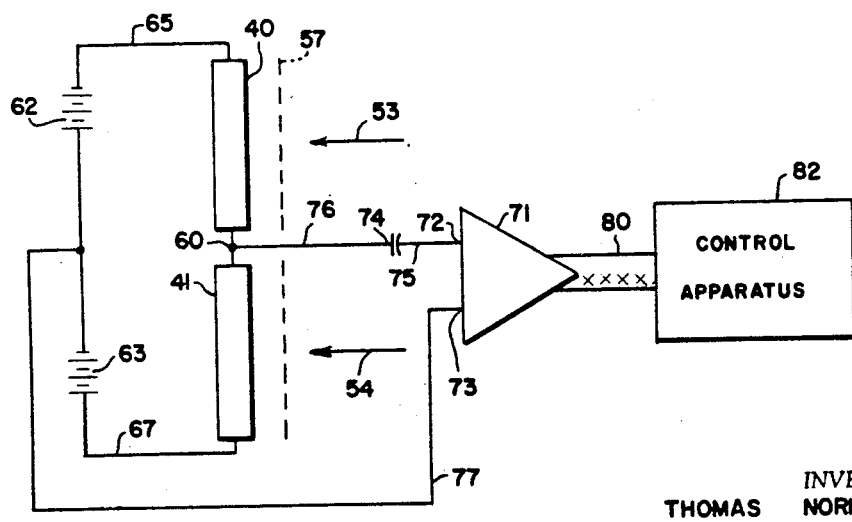
Figure 5:
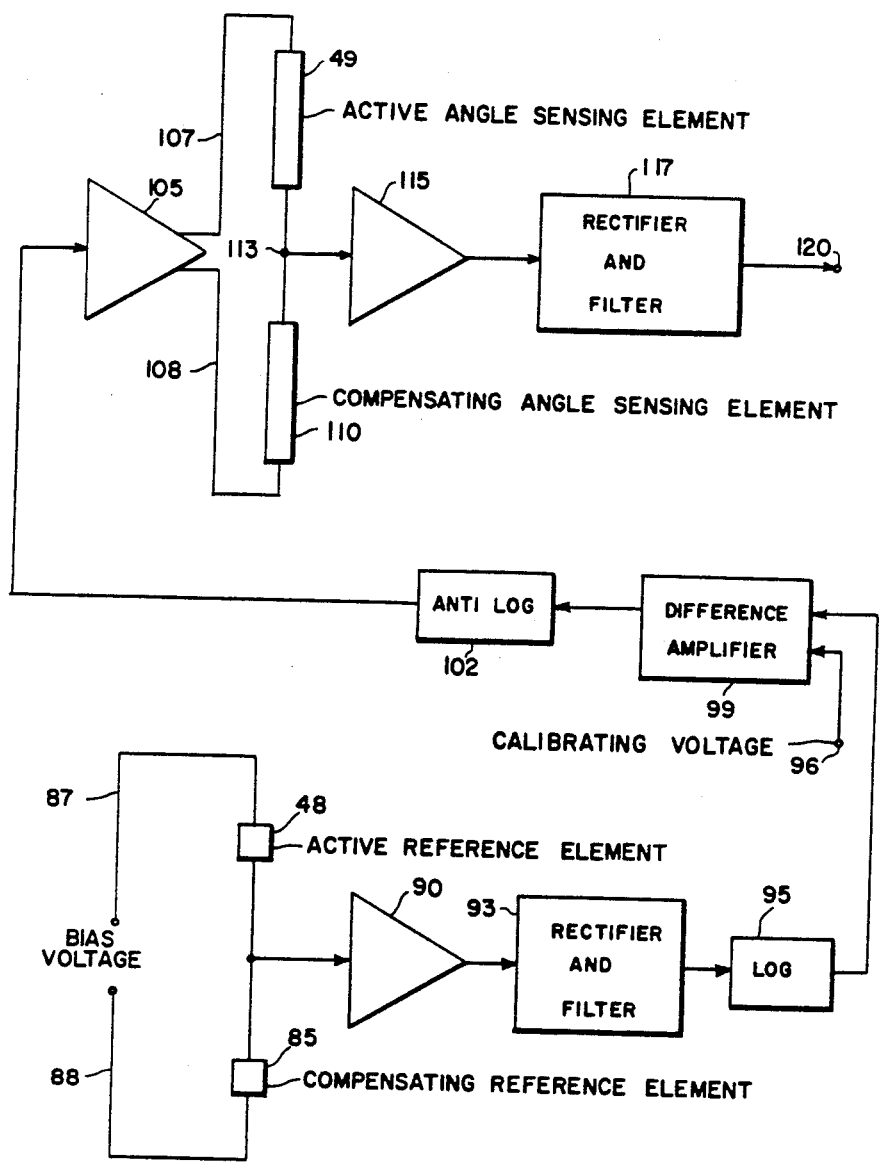

This and other objects of the present invention will become apparent upon a reading of the following specification and claims with reference to the drawings in which:

FIGURE 1 is a schematic representation of the optical system of the present invention;
FIGURE 2 is a view of the image plane of the lens showing normal energy configuration;
FIGURE 3 is a view of the image plane when the axes of the cone and lens are misaligned with respect to the energy source;
FIGURE 4 is a schematic diagram of a bridge circuit usable to provide a signal indicative of misalignment of the axis of the cone and lens with respect to the energy source; and
FIGURE 5 is a schematic diagram showing a circuit usable to determine the distance between the object and the source of energy.

In FIGURE 1 a hollow truncated cone 10 is shown having an axis 12 directed to a source of energy 13, for purposes of this explanation the cone 10 may be mounted on a space vehicle by means not shown and the source of energy 13 may be considered a planet which is radiating, for example, infrared energy. FIGURE 1 also shows a lens 15 mounted near the small end of cone 10 in such a manner that the axis is substantially coincident with the axis 12 of cone 10. The inner surface 17 of cone 10 is constructed so as to reflect the infrared energy radiated from the source 13 so that lens 15 receives energy from the source 13 directly from horizon to horizon as shown by paths 20 and 21 and also indirectly by reflection from surface 17 as shown by paths 25, 26, 27 and 28. The energy received directly from source 13 is focused by lens 15 onto its image plane 30 to form a substantially central image shown by the heavy line 32 thereon. The indirect or reflected energy from source 13 is focused by lens 15 on image plane 30 to form an annular image shown by the heavy line 35. Annular image 35 is normally substantially concentric with the direct image 32 whenever the axis of cone 12 is pointing directly at the center of the planet 13. Suitable sensors 40, 41, 42 and 43, best seen in FIGURE 2, are mounted proximate the image plane 30 in such a manner as to detect the position of the annular image 35. Also shown in FIGURE 1 are detectors 48 and 49 mounted proximate the image plane 30 so as to detect the radiation of the direct image 32 for purposes to be later explained.

FIGURE 1 also shows a filter 51 and a chopper 52 mounted between lens 15 and image plane 30. Filter 51 may be constructed to pass the spectral region from approximately 13 to 30 microns and thus to block or filter out the largest percentage of the sun's power thereby substantially eliminating the undersirable effect of the sun when it is in the field of view.

Chopper 52 may comprise a vibrating reed or like apparatus to cause the energy from source 13 to pulsate upon reaching the image plane 30 so as to provide better utilization of this energy in the bridge circuit to be described. Of course it should be realized that chopper 52 may be replaced by any other suitable type energy pulsator such as a block of germanium which when subjected to alternating current becomes alternatingly opaque and transparent to the infrared energy. Likewise the arrangement of lens 15, filter 51 and chopper 52 may be reversed or otherwise altered without effect to the system.

FIGURE 2 shows the energy configuration of the image plane 30 when the space vehicle is correctly aligned with the energy emitting source 13. In FIGURE 2 the direct image 32 is shown as a cross hatched spot in the center of the section and the reflected image 35 is shown as an annular ring surrounding and substantially concentric with the direct image 32. The energy sensors 40, 41, 42 and 43 which may be of the thermister bolometer type are shown positioned with respect to the annular image in a more or less square shape so that oppositely spaced sensors receive like amounts of energy when the space vehicle is correctly aligned. As shown in FIGURE 2, sensors 40 and 41 are placed on opposite sides of the direct image 32 and at a substantially equal distance away therefrom so that when the annular image is concentric with the direct image sensors 40 and 41 will receive like amounts of energy. Likewise sensors 42 and 43 are arranged at substantially equal distances from the direct image 32 so that when the annular image 35 is concentric therewith sensors 42 and 43 receive like amounts of energy. Also shown in FIGURE 2 are sensors 48 and 49 which are used in the altitude determination portion of the present invention to be later described.

FIGURE 3 shows the image plane 30 when the space vehicle is misaligned with respect to the source of energy 13. It is seen that the annulus 35 has moved to the left. Such a configuration would occur if the axis 12 in FIGURE 1 were directed to the right of the source of energy 13. It can be seen from FIGURE 3 that upon misalignment of the space vehicle with respect to the planet the energy distribution in the image plane 30 moves in such a way as to provide sensor 41 with more energy and to provide sensor 40 with less energy then it would receive if the apparatus were correctly aligned. The difference in energy received by sensors 40 and 41 may be utilized in a bridge circuit to be later described to provide a signal for moving the space vehicle back to the correct alignment position with respect to the source of energy. It is further seen that the sensors 42 and 43 are still receiving substantially the same amount of energy so that no correction signal in this direction would be provided for the situation shown in FIGURE 3.

To detect the unbalance signal occurring between sensors 40 and 41 in FIGURE 3, any suitable circuitry may be employed which will give an output indicative of unbalance and also indicative of the direction of unbalance. For example the bridge circuitry shown in the above referenced Killpatrick application or alternately the circuitry shown in the Killpatrick application, Ser. No. 134,510, filed Aug. 28, 1961, and assigned to the assignee of the present invention could be used. For purposes of this explanation reference will be had to FIGURE 4 in which simplified bridge circuitry has been shown suitable for utilization of the present invention. FIGURE 4 shows a bridge circuit employing two energy sensors such as 40 and 41 of the previous figures. Energy sensors 40 and 41 are exposed to the energy emitted from source 13 which is shown by arows 53 and 54 which energy is caused to pulsate by the chopper or modulator 57 which may be the same as the chopper 52 of FIGURE 1. The sensors 40 and 41 are connected in series by a conductor 60 and are supplied with DC energy from batteries or other DC sources 62 and 63 by means of conductors 65 and 67. A phase sensitive amplifier 71 has a pair of input terminals 72 and 73. Input terminal 72 is connected to conductor 60 by means of capacitor 74 having leads or conductors 75 and 76. Input terminal 73 is connected to the junction between batteries 62 and 63 by a conductor 77. When the energy sensitive elements 40 and 41 are matched and the batteries 62 and 63 are producing equal potential there will be no current between terminals 72 and 73 as long as the energy received by sensors 40 and 41 is the same. When however, the annular image 35 moves so to expose sensor 40 to less radiation and sensor 41 to more radiation a voltage will appear between terminals 72 and 73. Since chopper 57 operates to pulsate the energy received by sensors 40 and 41 the signal received at input terminals 72 and 73 is pulsating and the DC unbalance of the circuitry is blocked by capacitor 74. By blocking the DC signal, the bridge can distinguish between an unbalance caused by misalignment of the cone 10 and an unbalance caused by drift of the DC sources or other bridge parameters. The phase or sensor of the signal between terminals 72 and 73 depends upon which of the sensors receives the greater and which receives the lesser energy and a corresponding signal appears at the output 80 of amplifier 71. This output signal is shown being presented to control apparatus 82 which may be the reaction jets of the space vehicle or other such apparatus as is used to control the position of the vehicle in space. Depending upon the phase of this signal one or more of the reaction jets in the vehicle will operate in such a direction as to bring the vehicle back to the correct orientation with respect to the source of energy. Another such bridge as is shown in FIGURE 4 would be necessary to detect changes in the opposite axes and would employ energy sensors 42 and 43 therein. A more complete description of the bridge circuitry may be found in either of the above referenced two Killpatrick applications.

The apparatus for detecting the distance between the space vehicles and the planet will now be described. Referring to FIGURE 2 again, it is seen that sensors 48 and 49 are located with respect to the direct image 32 such that sensor 48 is always totally subject to the radiation while sensor 49 receives an amount of radiation dependent upon the radius of the direct image 32. The radius of the direct image 32 is proportional to the angle subtended by the energy source or planet 13 by the optical system and hence is proportional to the distance therebetween. The length of the sensor 49 is so chosen that it extends from substantially the center of the direct image 32 to a point equal to the radius of the largest direct image possible with the system so that when the system is correctly oriented with respect to the planet the amount of radiation received by sensor 49 is proportional to the altitude from the planet.

The sensor 48 would not normally be necessary if the radiance of the planet is accurately known in advance and if there is no variation due to changing planet surface temperatures. However, utilizing two detectors compensates for variations in the planet's radiance. Assuming that the planet image remains closely centered in the image plane, the output of energy detector 48 will be in accordance with the radiance from the planet and can be compared with the output from the angle sensing detector 49 to remove the radiance of the planet from consideration. In other words, the output from the sensor 49 may be divided by the output from the sensor 48 so that the factor of radiance cancels and the resulting voltage is of magnitude indicative of the angle subtended. Sensor 49 may be characterized in shape to correct for optical system deficiencies.

Of course, if the system is not correctly aligned with respect to the planet the direct image 32 and the annular image 35 move in opposite directions. The sensors 48 and 49 are then no longer properly located with respect to the direct image and the altitude sensing feature cannot be utilized. However since the system operates to maintain the space vehicle in the proper orientation the false signal that might develop would only be transitory.

FIGURE 5 shows a schematic block diagram of apparatus suitable for producing an output indicative of the angle subtended by the planet and thus of altitude. In FIGURE 5 the active reference element 48 is shown connected in series with a compensating element 85. The purpose of compensating element 85 is to compensate for ambient temperature variations that occur and to make the output of reference element 48 dependent only on the radiation received. Elements 48 and 85 are connected to a source of bias voltage by conductors 87 and 88 respectively and the output of this circuit is presented to an amplifier 90. The incoming radiation received by the active reference element 48 has been filtered and chopped by the elements 51 and 52 of FIGURE 1 and hence the output of amplifier 90 is a modulated signal of magnitude indicative of the radiation received by active reference element 48. The output of amplifier 90 is presented to a rectifier and filter 93 which removes the carrier. The filtered output from the rectifier 93 is presented to a logarithm circuit 95 which converts the signal into a logarithm for comparison with a calibrating voltage. The calibrating voltage is provided at a terminal 96 and the signals from the logarithm circuit 95 and from the calibrating voltage 96 are presented to a difference amplifier 99. The output of the difference amplifier 99 is presented to an antilog circuit 102 which removes the logarithm from the output of the difference amplifier. Assuming that the voltage from the reference element 48 to the amplifier 90 and rectifier 93 is of magnitude V and the calibrating voltage is of magnitude log $V_o$ the output of the antilog circuit 102 will be the ratio $V_o/V$ since subtracting logarithms in the difference amplifier 99 has the effect of division. The output of antilog circuit 102 which is of magnitude $V_o/V$ is presented to an amplifier 105 and then by conductors 107 and 108 to active angle sensing element 49 and a compensating angle sensing element 110 respectively to provide the bias for these elements. Angle sensing element 49 and compensating element 110 are connected in series by conductor 113 which is connected to the input of an amplifier 115. Compensating angle sensing element 110 is utilized in conjunction with the angle sensing element 49 to remove the dependence on ambient temperature and to provide an output on conductor 113 indicative solely of the radiation received by angle sensing element 49 and the bias voltage across elements 49 and 110. The effect of this circuit is to multiply the signal received by the active angle sensing element 49 and the bias voltage and since the bias voltage is indicative of $V_o/V$ the output on conductor 113 is indicative of the ratio of the signals received by the active sensing element 49 and the active reference element 48. As previously stated this output voltage is then solely indicative of the angle subtended by the planet and as such is indicative of the distance between the planet and the space vehicle if the diameter of the planet is known as it usually is. The voltage on conductor 113 is modulating because the radiation received by active angle sensing element 49 has been chopped with the chopper 52 of FIGURE 1 and so the signal from amplifier 115 is presented to a rectifier and filter 117 to remove the carrier. The output from rectifier 117 is presented to a terminal 120 and is a voltage whose magnitude is indicative of the subtended angle and thus of altitude. Terminal 120 may be connected to telemetering equipment or to an indicator (not shown) to provide an indication of altitude of the space vehicle with respect to the planet. If the indicator or telemetering equipment were designed to be operable with the AC from amplifier 115, then the rectifier and filter 117 would not be necessary.

Of course it should be realized that other practical dividing circuits are available and may be used to divide the signals from the sensors 48 and 49 to obtain the desired output. The apparatus of FIGURE 5 is shown here merely to show a preferred embodiment operable with the present invention.

Referring once again to FIGURE 1 it is seen that if the space vehicle moves further away from planet 13 the direct image 32 becomes smaller approaching a point when the planet is at a very great distance. It is also seen that the annular image 35 decreases in width approaching a circular line when the planet is at a very great distance. Likewise as the space vehicle moves closer and closer to the planet 13 the central image 32 increases in diameter and the annular image 35 increases in width with the outer edge thereof moving away from the center and the inner edge thereof moving towards the center. As long as the space vehicle is oriented properly with respect to the planet the amount of radiation received by oppositely situated sensors 40–41 and 42–43 will be the same and the apparatus will continually perform to maintain the proper attitude for the space vehicle. As the space vehicle approaches very close to the planet 13 the expanding direct image 32 and the inner edge of the annular image 35 eventually meet at which time the altitude sensors 48 and 49 will cease to function to provide correct altitude indications. However the attitude sensing mechanism will continue to provide correct orientation for the space vehicle with respect to the planet. Eventually as the craft moves closer to the planet the angle subtended by the planet will exceed the limits of the cone 10 and energy will begin to strike the outer surface of the cone 10. As shown in the copending Killpatrick application, Ser. No. 101,238, an inside-out type image thereafter begins to form on the image plane 30. That is to say the energy reflected from the outer surface of cone 10 from the planet 13 forms a circular image the outside of which represents the energy received from the planet whereas the inside of the image represents the lack of radiation from space. The outside of cone 10 in the present invention may therefore be made reflective so that attitude control may be maintained even after the craft has approached so close to the planet that the energy therefrom is reflected off the outer surface.

It is therefore seen that apparatus has been provided which will maintain the attitude of a craft with respect to a planet over a very large variation in altitude and that in addition indications indicative of altitude may be obtained up to a point where the craft becomes very close to the planet. It should be understood that many modifications may be made to the device shown in the preferred embodiment by one skilled in the art and I therefore do not wish to be limited to the specific disclosures used with reference to the preferred embodiment but intend only to be limited by the following claims.

I claim:
1. Apparatus for use with a substantially circular source of radiant energy comprising, in combination:
   a hollow cone having a base end, a truncated end and a reflecting inner surface;
   a lens having an image plane and being mounted proximate to the truncated end of said cone;
   means mounting said cone so that the base end thereof is normally directed toward the source, radiant energy from the source entering the hollow cone and traveling both directly to the lens and by reflection from the inner surface to the lens so that at least two images are formed by said lens on the image plane, a first of the images being a substantially circular image of the source the radius of which changes with the distance from the cone to the source and a second of the images being a normally circular annulus normally surrounding and concentric with the first of the images, the first and second images moving out of concentricity on the image receiving plane with variation in the direction between the base end of said cone and the source;
   first energy detecting means mounted proximate to the image receiving plane and providing an output whenever the second image moves from concentricity with the first image;
   means connected to said first energy detecting means to receive the output therefrom and operable to position the cone so as to direct the base thereof toward the source;
   and second energy detecting means mounted proximate to the image receiving plane so as to extend from inside to beyond the periphery of the first image and to provide an output indicative of the radius of the first image.

2. Apparatus for controlling the attitude of an object with respect to an energy source comprising, in combination:
   a hollow truncated cone having an axis, and a reflecting inner surface;
   a lens having an axis and an image plane;
   means mounting said lens and said cone to the object so that the axis of the cone and the axis of the lens substantially coincide and are normally directed toward the energy source, energy from the energy source normally being received by said lens both directly and by reflection from the reflecting inner surface of said cone so as to form a normally central direct image and a normally concentric annular reflected image in the image plane of said lens;

energy responsive means mounted on the object proximate to the image plane of said lens and operable to detect the concentricity of the annular image with respect to the direct image and to provide an output whenever the two images are not concentric;

and control means connected to said energy responsive means operable upon receipt of an output therefrom to vary the relative positions of the object and the energy source.

References Cited

UNITED STATES PATENTS

| | | |
|---|---|---|
| 2,444,639 | 7/1948 | Elder. |
| 2,766,387 | 8/1956 | Bolsey _____ 250—203 |
| 2,788,708 | 4/1957 | Williamson _____ 250—57 |
| 3,028,500 | 4/1962 | Wallmark _____ 250—203 X |
| 3,032,660 | 5/1962 | Kim _____ 88—23 |
| 3,098,934 | 7/1963 | Wilson et al. _____ 88—1 X |

OTHER REFERENCES

Carlisle et al.: "Bore Profilometer," Instruments, vol. 26, December 1953, pages 1882, 1883 and 1906.

JEWELL H. PEDERSEN, *Primary Examiner.*

W. L. SIKES, *Assistant Examiner.*